United States Patent
Chow et al.

(10) Patent No.: US 12,115,623 B2
(45) Date of Patent: Oct. 15, 2024

(54) CENTERING A WASHER TO A FASTENER ELEMENT DURING INSTALLATION

(71) Applicant: Pratt & Whitney Canada Corp., Longueuil (CA)

(72) Inventors: Bernard Chow, Mississauga (CA); Gerard Theriault, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/983,815

(22) Filed: Nov. 9, 2022

(65) Prior Publication Data

US 2024/0149404 A1    May 9, 2024

(51) Int. Cl.
*B25B 13/48* (2006.01)
*F02C 7/20* (2006.01)
*F16B 43/00* (2006.01)

(52) U.S. Cl.
CPC ............... *B25B 13/48* (2013.01); *F02C 7/20* (2013.01); *F16B 43/00* (2013.01); *F05D 2230/60* (2013.01); *F05D 2260/31* (2013.01)

(58) Field of Classification Search
CPC ..... B25B 13/48; B25B 23/0085; B25B 21/00; B25B 13/065; F02C 7/20; F16B 43/00; F05D 2230/60; F05D 2260/31
See application file for complete search history.

(56) References Cited

U.S. PATENT DOCUMENTS

| | | | |
|---|---|---|---|
| 2,202,240 A * | 5/1940 | Trotter | B25B 13/065 81/124.6 |
| 6,152,243 A * | 11/2000 | Junkers | B25B 21/005 173/171 |
| 6,701,808 B2 | 3/2004 | Hsieh | |
| 7,044,031 B1 | 5/2006 | Mullen | |
| 8,069,754 B2 | 12/2011 | Elgin | |
| 8,631,724 B2 | 1/2014 | Miyata | |
| 8,950,297 B2 | 2/2015 | Sumg | |
| 9,027,445 B2 | 5/2015 | Sumg | |
| 9,416,810 B2 | 8/2016 | Swinderman | |
| 10,751,858 B1 | 8/2020 | Gershkovich | |
| 11,045,930 B2 | 6/2021 | Dietze | |
| 2001/0035003 A1 * | 11/2001 | Sinha | F02C 7/24 60/752 |
| 2010/0239390 A1 * | 9/2010 | Junkers | B25B 23/0085 411/11 |

(Continued)

OTHER PUBLICATIONS

EP Search Report for EP Patent Application No. 23208847.6 dated Apr. 17, 2024.

*Primary Examiner* — Lee A Holly
(74) *Attorney, Agent, or Firm* — Getz Balich LLC

(57) ABSTRACT

An assembly method is provided during which a first component is arranged with a second component. The first component is secured to the second component using a fastener assembly. The fastener assembly includes a fastener element and a washer. The fastener element includes a wrenching feature. The washer has a full-hoop annular body with a cylindrical outer surface. The securing includes: mating a socket device with the fastener element and the washer, the socket device engaging the wrenching feature and the cylindrical outer surface; and rotating the fastener element about an axis using the socket device to tighten the fastener assembly and clamp the washer axially between the first component and the fastener element. The socket device centers the washer to the fastener element during the rotating.

15 Claims, 10 Drawing Sheets

(56) References Cited

U.S. PATENT DOCUMENTS

| | | |
|---|---|---|
| 2011/0185860 A1 | 8/2011 | Chang |
| 2013/0236305 A1* | 9/2013 | Hashimoto ............. F01D 25/24 |
| | | 415/230 |
| 2016/0243685 A1* | 8/2016 | Blake .................... B25B 13/065 |
| 2017/0021478 A1 | 1/2017 | Junkers |
| 2017/0067501 A1 | 3/2017 | Furu-Szekely |
| 2019/0003512 A1* | 1/2019 | Junkers ............... B25B 23/1415 |
| 2020/0087000 A1* | 3/2020 | Martinez ................ B64D 27/18 |
| 2021/0291324 A1 | 9/2021 | You |
| 2021/0299826 A1 | 9/2021 | Luppi |

\* cited by examiner

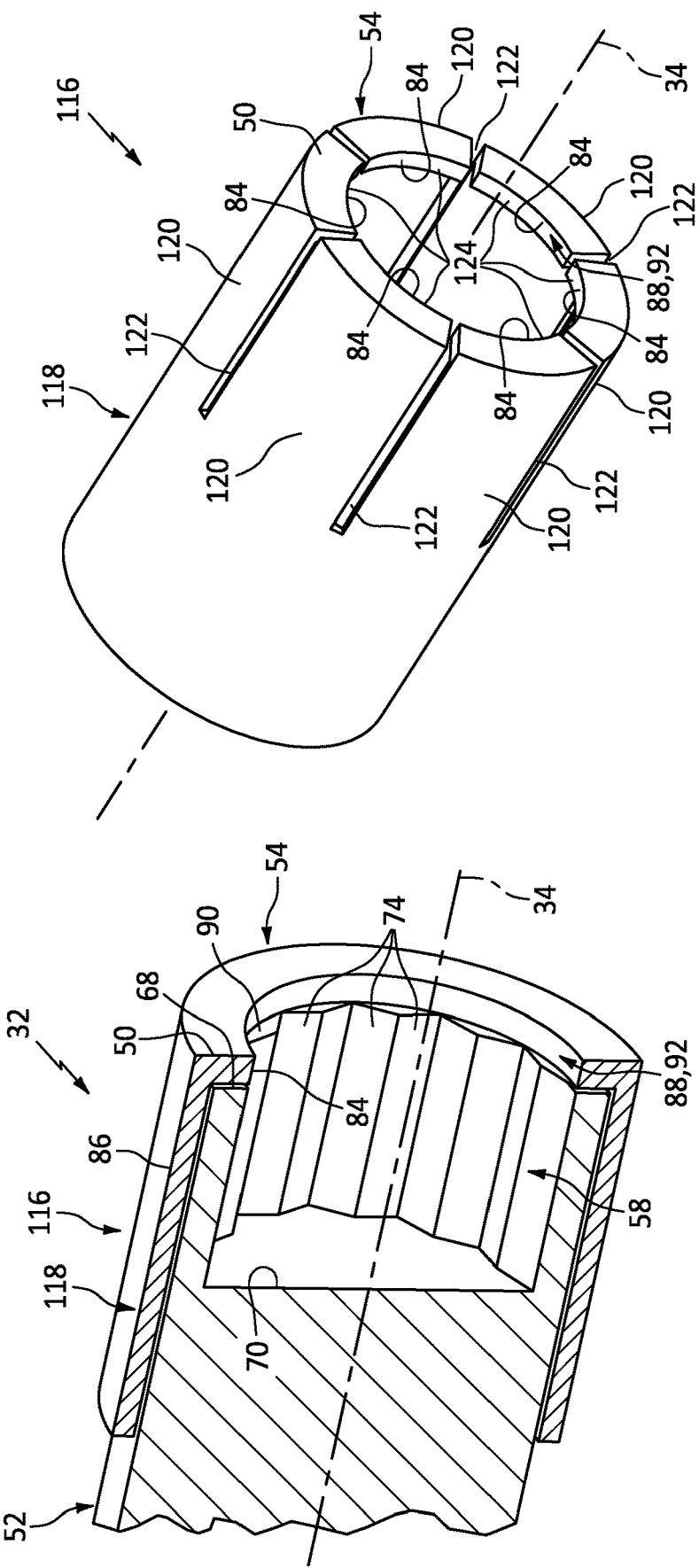

CENTERING A WASHER TO A FASTENER ELEMENT DURING INSTALLATION

TECHNICAL FIELD

This disclosure relates generally to a mechanical joint between components and, more particularly, to securing the components together using one or more fastener assemblies with washers.

BACKGROUND INFORMATION

A structure of a gas turbine engine may include components bolted together at a joint. A washer may be arranged between a head of a bolt and the components. While the bolt is tightened and torqued to specification, rotation of the bolt head may cause the washer to skew to a side of the bolt head. Skewing between the washer and the bolt head may have a negative impact on pressure loading/distribution onto an adjacent component. Furthermore, skewing between the washer and the bolt head may induce a rotational imbalance where the structure is a (e.g., high speed) rotating structure of the gas turbine engine. There is a need in the art therefore for methods and apparatuses for centering a washer relative to a fastener.

SUMMARY

According to an aspect of the present disclosure, an assembly method is provided during which a first component is arranged with a second component. The first component is secured to the second component using a fastener assembly. The fastener assembly includes a fastener element and a washer. The fastener element includes a wrenching feature. The washer has a full-hoop annular body with a cylindrical outer surface. The securing includes: mating a socket device with the fastener element and the washer, the socket device engaging the wrenching feature and the cylindrical outer surface; and rotating the fastener element about an axis using the socket device to tighten the fastener assembly and clamp the washer axially between the first component and the fastener element. The socket device centers the washer to the fastener element during the rotating.

According to another aspect of the present disclosure, another assembly method is provided during which a first component is arranged with a second component. The first component is secured to the second component using a fastener assembly. The fastener assembly includes a bolt and a washer. The bolt includes a bolt head with a wrenching feature. The washer has an outer surface. The securing includes: mating a socket device with the bolt head and the washer, the socket device engaging the wrenching feature and the outer surface; and rotating the bolt head about an axis using the socket device to tighten the fastener assembly and clamp the washer axially between the first component and the bolt head. The socket device maintains the washer coaxial with the bolt during the rotating.

According to still another aspect of the present disclosure, a socket device is provided that includes a socket and a socket adaptor. The socket includes an axial end and a receptacle with a polygonal cross-sectional geometry. The receptacle projects axially along an axis into the socket from the axial end. The socket is configured to receive a fastener element within the receptacle. The fastener element is a bolt head or a nut. The socket adaptor includes a centering sleeve and a sleeve mount. The centering sleeve includes an inner surface and forms a counterbore at the axial end of the socket. The centering sleeve is configured to receive a washer within the counterbore. The centering sleeve projects radially inward to the inner surface. The inner surface is configured to radially engage the washer. The inner surface has a uniform radius to the axis as the inner surface extends circumferentially about the axis. The sleeve mount circumscribes the socket and mounts the centering sleeve to the socket.

The centering sleeve may have a full-hoop annular geometry. The inner surface may be a cylindrical inner surface.

The socket adaptor may also include a plurality of fingers arranged circumferentially about the axis. Each of the fingers may include a respective circumferential section of the centering sleeve.

The outer surface may be a cylindrical outer surface of the washer.

The socket device may include a cylindrical inner surface. The cylindrical inner surface may circumscribe and may be radially adjacent the cylindrical outer surface.

The socket device may include a plurality of arcuate surfaces. The arcuate surfaces may be arranged circumferentially around and may be radially adjacent the cylindrical outer surface.

The socket device may include a counterbore at an axial end of the socket device. The washer may be seated in the counterbore.

The socket device may also include a receptacle with a polygonal cross-sectional geometry. The receptacle may project axially into the socket device from the counterbore. The receptacle may receive the wrenching feature.

The socket device may include a centering sleeve. The centering sleeve may extend circumferentially around the washer and may radially engage the cylindrical outer surface.

The centering sleeve may be circumferentially segmented.

The centering sleeve may have a full-hoop annular geometry.

The socket device may also include a socket that mates with the wrenching feature. The socket device may be configured as a monolithic body.

The socket device may also include a socket and a sleeve mount. The socket may mate with the wrenching feature. The sleeve mount may circumscribe the socket. The sleeve mount may mount the centering sleeve to the socket.

An outer diameter of the cylindrical outer surface may be equal to or greater than a largest outer lateral width of the fastener element.

An outer diameter of the cylindrical outer surface may be less than a largest outer lateral width of the fastener element.

The fastener element may be configured as or otherwise include a bolt head.

The fastener element may be configured as or otherwise include a nut.

The first component may include a first mount. The second component may include a second mount abutted against the first mount. The fastener assembly may secure the first mount to the second mount.

A gas turbine engine rotating structure may include the first component, the second component and the fastener assembly.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 10 is a partial perspective cutaway illustration of the socket device with an adaptor mounted to a socket.

FIG. 11 is a perspective illustration of the adaptor configured with fingers.

DETAILED DESCRIPTION

Figure 1:
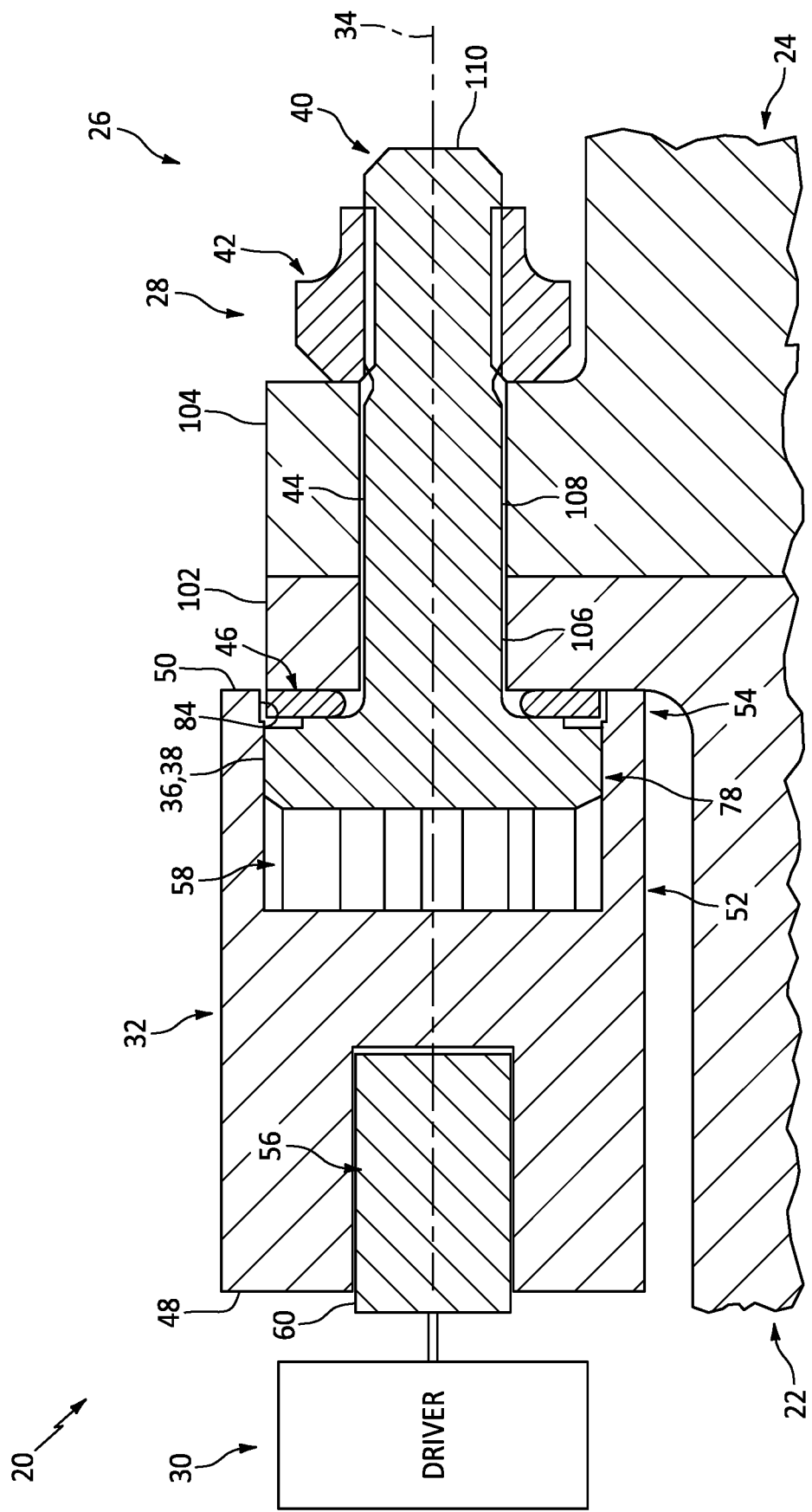
FIG. 1 is a partial sectional illustration of a tool tightening a fastener assembly to secure components of a structure together.

FIG. 1 illustrates a tool 20 for use in securing components 22 and 24 of a structure 26 together at a joint with one or more fastener assemblies 28 (one fastener assembly shown in FIG. 1). The tool 20 of FIG. 1 includes a driver 30 and a socket device 32. Examples of the driver 30 include, but are not limited to, a manual rachet, a power rachet (e.g., an electrically or pneumatically powered impact wrench) or any other device capable of driving rotation of the socket device 32 about an axis 34, which axis 34 may be a centerline axis and/or a rotational axis of the socket device 32 and/or the respective fastener assembly 28.

The socket device 32 of FIG. 1 is configured to operatively couple the driver 30 to a fastener element 36 of the respective fastener assembly 28. The driver 30 may thereby drive rotation of the fastener element 36 about the axis 34 through the socket device 32 by driving rotation of the socket device 32 about the axis 34. For ease of description, the fastener element 36 of FIG. 1 may be described herein as a head 38 of a fastener 40; e.g., a bolt. However, it is contemplated the fastener element 36 may alternatively be a nut 42 threaded onto a shank 44 of the fastener 40 of FIG. 1 (or another type of fastener such as threaded stud). The socket device 32 of FIG. 1 is also configured to center a washer 46 of the respective fastener assembly 28 with the fastener element 36 (e.g., the bolt head) as the fastener element 36 is rotated about the axis 34. For ease of description, the washer 46 may be described herein as a regular washer. However, it is contemplated the washer 46 may alternatively be a lock washer or any other type of washer which would benefit from centering as described herein.

Figure 2:
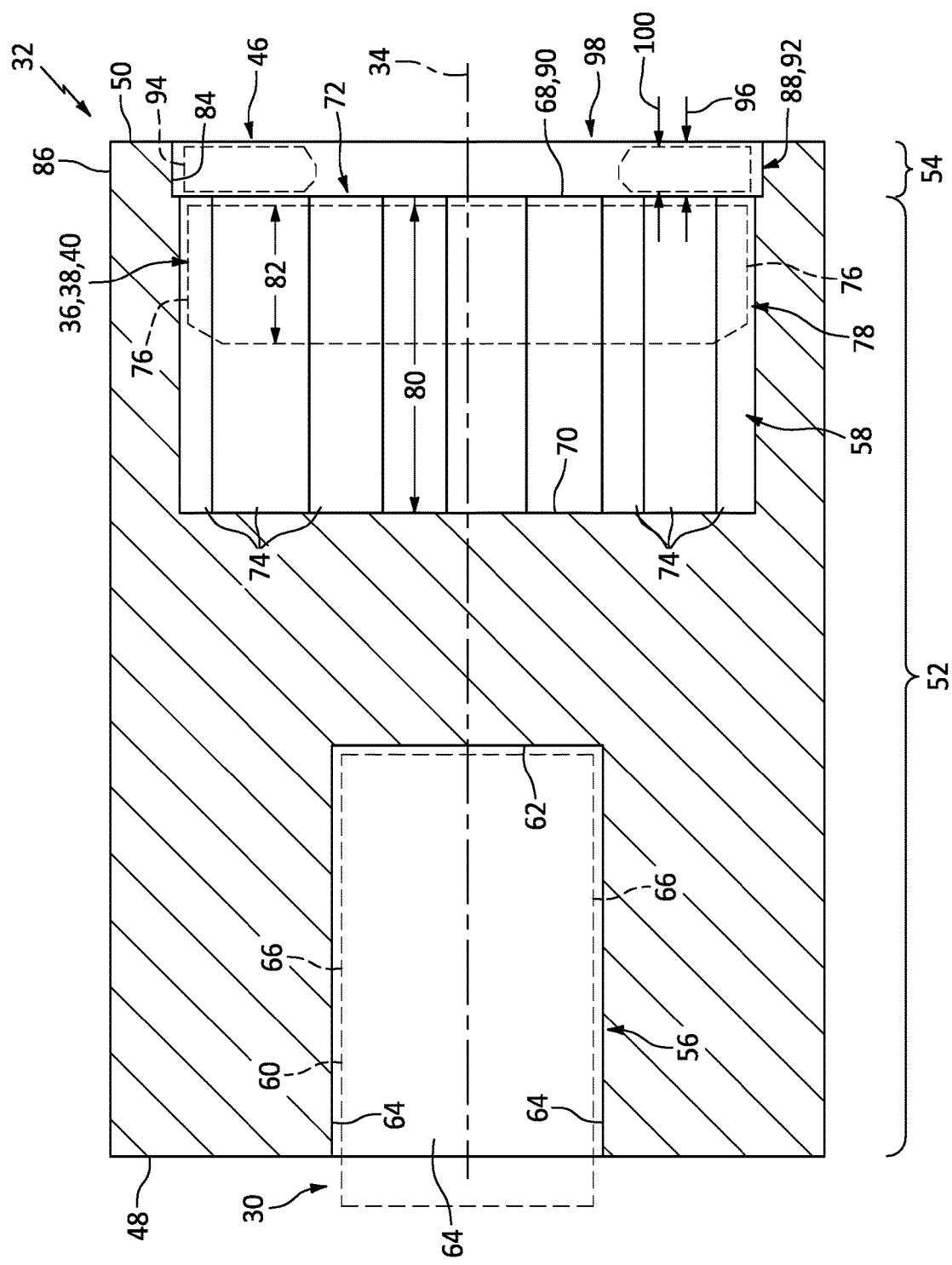
FIG. 2 is a sectional illustration of a socket device depicted with dashed line representations of portions of the tool and the fastener assembly.

Referring to FIG. 2, the socket device 32 extends axially along the axis 34 between and to a first (e.g., tool side) end 48 of the socket device 32 and a second (e.g., fastener side) end 50 of the socket device 32. The socket device 32 includes a socket 52 and a washer centering sleeve 54.

The socket 52 may be arranged at the device first end 48. The socket 52 of FIG. 2, for example, extends axially along the axis 34 from the device first end 48 to the centering sleeve 54. The socket 52 of FIG. 2 includes a driver receptacle 56 and a fastener receptacle 58.

The driver receptacle 56 is configured to receive a drive element 60 of the driver 30. The driver receptacle 56 of FIG. 2, for example, projects axially into the socket device 32 and its socket 52 from the device first end 48 to an axial end 62 of the driver receptacle 56.

Figure 3:
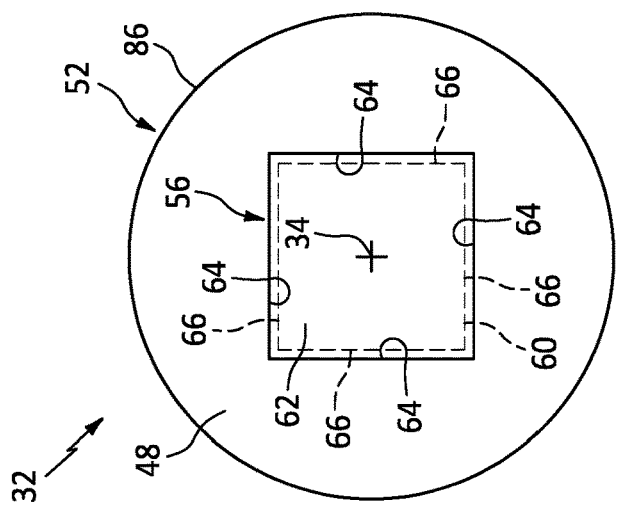
FIG. 3 is a first end view illustration of the socket device depicted with a dashed line representation of a driver element.

Referring to FIG. 3, the driver receptacle 56 may be configured with polygonal cross-sectional geometry when viewed, for example, in a reference plane perpendicular to the axis 34. The cross-sectional geometry of the driver receptacle 56 may be sized and shaped to match (e.g., be the substantially the same as) a cross-sectional geometry of the drive element 60. The cross-sectional geometry of the driver receptacle 56 of FIG. 3, for example, is square shaped and sized slightly larger than the drive element 60 such that the drive element 60 may be readily mated with (or removed from) the driver receptacle 56. An example specification for sizing the driver receptacle 56 and/or the drive element 60 can be found in the American Society of Mechanical Engineers (ASME) standard B107.4; however, the present disclosure is not limited to this standard. With this arrangement, one or more flats 64 (e.g., planar surfaces) forming sides of the driver receptacle 56 may respectively engage (e.g., contact) one or more respective flats 66 forming sides of the drive element 60 to rotationally fix the socket 52 and, more generally, the socket device 32 to the drive element 60. Of course, various other coupling techniques are known in the art for rotatably fixing elements together and the present disclosure is not limited to any particular ones thereof.

Referring to FIG. 2, the fastener receptacle 58 is configured to receive the fastener element 36 (see FIG. 1). The fastener receptacle 58 of FIG. 2, for example, projects axially into the socket 52 (and axially within the socket device 32) from a second (e.g., fastener side) end 68 of the socket 52 to an axial end 70 of the fastener receptacle 58. The socket second end 68 of FIG. 2 is recessed slightly axially in from the device second end 50 such that an opening 72 to the fastener receptacle 58 is proximate the device second end 50.

Figure 4:
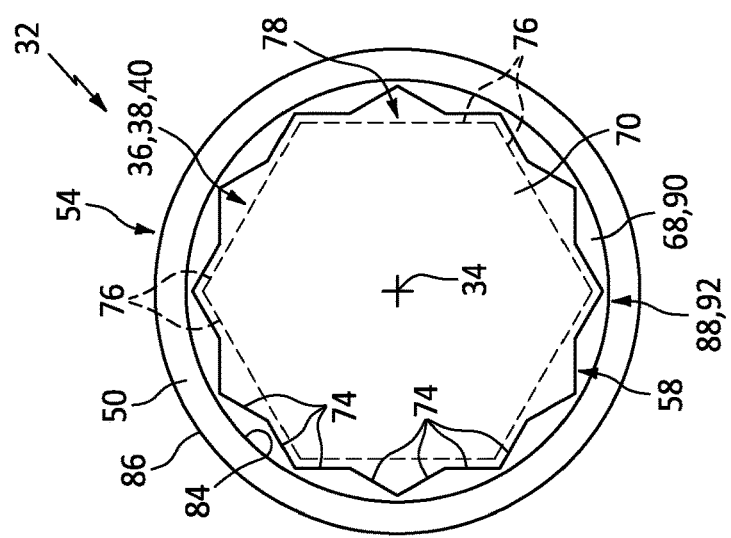
FIG. 4 is a second end view illustration of the socket device depicted with a dashed line representation of a fastener element.

Referring to FIG. 4, the fastener receptacle 58 may be configured with polygonal cross-sectional geometry when viewed, for example, in a reference plane perpendicular to the axis 34. The cross-sectional geometry of the fastener receptacle 58 may be sized and shaped to match (e.g., be the substantially the same as) or otherwise accommodate a cross-sectional geometry of the fastener element 36. The cross-sectional geometry of the fastener receptacle 58 of FIG. 4, for example, is double hex shaped (or triple square shaped) and sized slightly larger than the fastener element 36 such that the fastener element 36 may be readily mated with (or removed from) the fastener receptacle 58. An example specification for sizing the fastener element 36 and/or the fastener receptacle 58 can be found in the ASME standard B107.110; however, the present disclosure is not limited to this standard. With this arrangement, one or more flats 74 (only some of which are labeled for ease of illustration) (e.g., planar surfaces) forming sides of the fastener receptacle 58 may respectively engage (e.g., contact) one or more respective flats 76 (only some of which are labeled for ease of illustration) forming sides of the fastener element 36 to rotationally fix the socket 52 and, more generally, the socket device 32 to the fastener element 36; e.g., the bolt head. Here, the fastener element flats 76 form an exterior wrenching feature 78 of the fastener element 36; e.g., a single hex shaped wrenching feature. The present disclosure, however, is not limited to such an exemplary fastener receptacle, fastener element nor wrenching feature configuration. The cross-sectional geometry of the fastener receptacle 58, the fastener element 36 and/or the wrenching feature 78, for example, may alternatively be hexagonal (e.g., single hex) shaped, square shaped, double square shaped, Torx coupling shaped, etc. Furthermore, it is contemplated the wrenching feature 78 may alternatively be configured as an internal wrenching feature such as a socket for an Allen head, a Torx head, etc.

Referring to FIG. 2, the fastener receptacle 58 has an axial length 80 measured from the fastener receptacle opening 72 at the socket second end 68 to the fastener receptacle end 70. This fastener receptacle length 80 may be sized to be equal to or larger than an axial thickness 82 of the fastener element 36 to be received within the fastener receptacle 58.

Figure 5:
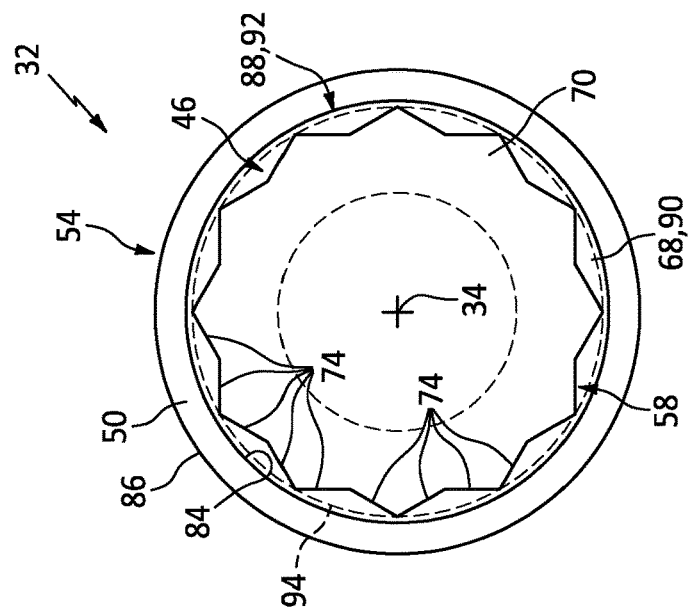
FIG. 5 is another second end view illustration of the socket device depicted with a dashed line representation of a washer.

The centering sleeve 54 may be arranged at the device second end 50. The centering sleeve 54 of FIG. 2, for example, extends axially along the axis 34 from the socket second end 68 to the device second end 50. The centering sleeve 54 extends radially from a (e.g., cylindrical) inner surface 84 of the centering sleeve 54 to an outer surface 86 of the socket device 32. Referring to FIG. 5, the centering sleeve 54 extends circumferentially about (e.g., completely around) the axis 34 providing the centering sleeve 54 with a full-hoop geometry annular geometry.

Referring to FIG. 2, the centering sleeve 54 forms a counterbore 88 in the socket device 32 at the device second end 50. This counterbore 88 projects axially into the socket device 32 and its centering sleeve 54 from the device second end 50 to a (e.g., unsegmented, annular) shoulder 90 at the socket second end 68. The counterbore 88 projects radially outward (away from the axis 34) into the socket device 32 and its centering sleeve 54 from the fastener receptacle flats 74 to the sleeve inner surface 84. This counterbore 88 may form a receptacle 92 for the washer 46. In particular, the centering sleeve 54 is configured to receive the washer 46 in the washer receptacle 92. The washer receptacle 92 of FIG. 5, for example, may be configured with a circular cross-sectional geometry when viewed, for example, in a reference plane perpendicular to the axis 34. This circular cross-sectional geometry is sized to match (e.g., be substantially the same as) a circular cross-sectional geometry of the washer 46. A radius of the sleeve inner surface 84, for example, may be sized to be equal to or slightly larger than a radius of a (e.g., cylindrical) outer surface 94 of the washer 46. An example specification for sizing the washer 46 and/or the centering sleeve 54 can be found in the ASME standard Y14.5; however, the present disclosure is not limited to this standard. With such an arrangement, the washer 46 may be readily mated with (or removed from) the washer receptacle 92. However, the sleeve inner surface 84 may follow the washer outer surface 94 close enough so as to provide an alignment guide for the washer 46 as described below in further detail.

Referring to FIG. 2, the washer receptacle 92 has an axial length 96 measured from an opening 98 to the washer receptacle 92 at the device second end 50 to the washer receptacle shoulder 90. This washer receptacle length 96 may be sized to be equal to an axial thickness 100 of the washer 46 to be received therein. In other embodiments, it is contemplated the washer receptacle length 96 may alternatively be slightly smaller than the washer thickness 100. However, in general, the washer receptacle length 96 is not larger than the washer thickness 100 such that, for example, the socket device 32 does not project axially beyond the washer 46 and potentially rub against the first component 22 (see FIG. 1). Furthermore, the washer receptacle length 96 may be sized smaller than the washer thickness 100 where an outer diameter of the washer 46 is smaller than a maximum diameter of a bearing surface (e.g., a surface contacting the washer 46) of the fastener head 38 (or the nut 42) to avoid axial pinching of the device second end 50 against the first component 22, for example, under an application of torque preloading the washer 46. The washer receptacle length 96 may also be sized smaller than the washer thickness 100 to avoid rubbing of the device second end 50 against a critical surface finish of mating parts under the washer 46; e.g., the first component 22 of FIG. 1.

Figure 6:
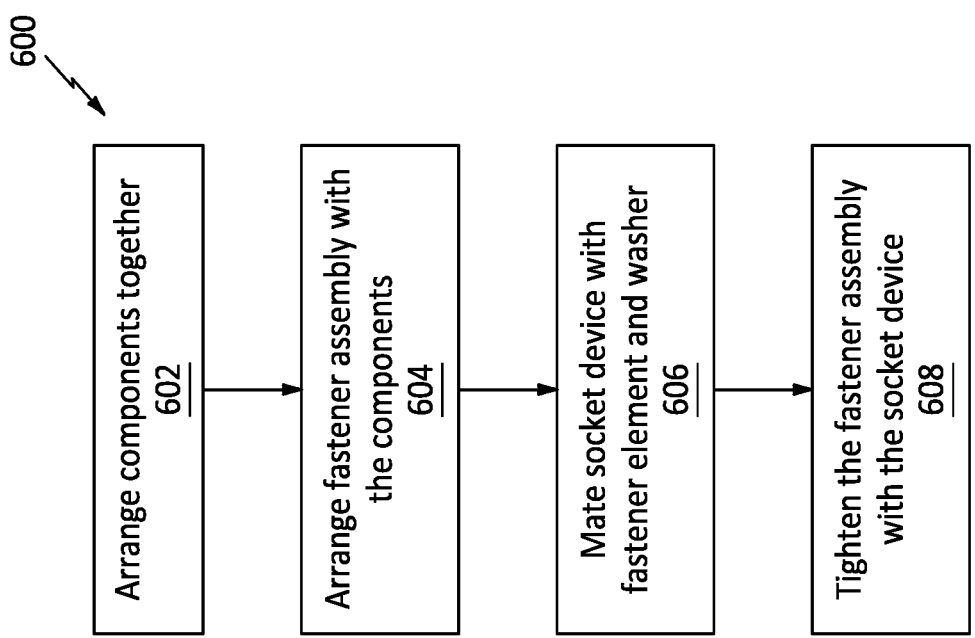
FIG. 6 is a flow diagram of a method for assembling a structure.

FIG. 6 is a flow diagram of a method 600 for assembling a structure. For ease of description, the assembly method 600 may be described below with respect to the tool 20 and the structure 26 of FIGS. 1-5. The method 600 of the present disclosure, however, may alternatively be performed to assemble a structure with various other configurations. The assembly method 600 may also or alternatively be performed using a tool with various other configurations. The socket device 32 of FIGS. 1-5, for example, may alternatively be swapped out for any one of the other socket device configurations discussed below.

In step 602, the first component 22 is arranged with the second component 24. A mount 102 (e.g., an annular flange or rim) of the first component 22 of FIG. 1, for example, is arranged axially adjacent and abutted against a mount 104 (e.g., an annular flange or rim) of the second component 24. A first fastener aperture 106 through the first mount 102 is aligned with (e.g., positioned coaxial with) a second fastener aperture 108 through the second mount 104.

In step 604, the fastener assembly 28 is arranged with the first component 22 and the second component 24. The washer 46 of FIG. 1, for example, is mounted onto the fastener 40. In particular, a distal axial end 110 of the fastener shank 44 is passed through a bore of the washer 46 to slide the washer 46 onto the fastener shank 44. The washer 46 thereby circumscribes the fastener shank 44, and the washer 46 may axially engage (e.g., abut against) the fastener head 38. The fastener 40 (with the mounted washer 46) may then by mated with the fastener apertures 106 and 108. The shank end 110, for example, may be passed sequentially through the first fastener aperture 106 and the second fastener aperture 108 until, for example, the washer 46 axially engages (e.g., abuts against) the first component 22. The nut 42 may then be mated with the fastener shank 44. The nut 42, for example, may be threaded onto the fastener shank 44 until, for example, the nut 42 axially engages (e.g., abuts against) the second component 24. Alternatively, the fastener shank 44 may be threaded into the nut 42 as the fastener 40 is mated with the fastener apertures 106 and 108. Once the fastener 40 (with the mounted washer 46) projects through the fastener apertures 106 and 108 and is (e.g., loosely) mated with the nut 42, the members 46, 102 and 104 are arranged sequentially axially along the axis 34 between the fastener head 38 and the nut 42.

In step 606, the socket device 32 is mated with the fastener element 36 and the washer 46. The socket device 32 of FIG. 2, for example, is slid (e.g., translated) axially onto the fastener assembly 28 such that (A) the fastener head 38 and its wrenching feature 78 are received within the fastener receptacle 58 and (B) the washer 46 is received within the washer receptacle 92. Within the fastener receptacle 58 of FIG. 4, one or more of the fastener receptacle flats 74 may respectively engage (e.g., abut against) one or more of the fastener element flats 76. Within the washer receptacle 92 of FIG. 2, the washer 46 may axially engage (e.g., abut against) the washer receptacle shoulder 90. Referring to FIG. 5, at least a portion of the washer outer surface 94 may also or alternatively radially engage (e.g., abut against) at least a portion of the sleeve inner surface 84. By forming a boundary circumferentially around the washer 46, the centering sleeve 54 may prevent the washer 46 from shifting outside of that boundary set by the centering sleeve 54. The centering sleeve 54 may thereby maintain the washer 46 centered with (e.g., coaxial with) the fastener element 36 while the washer 46 is within the washer receptacle 92.

Figure 7:
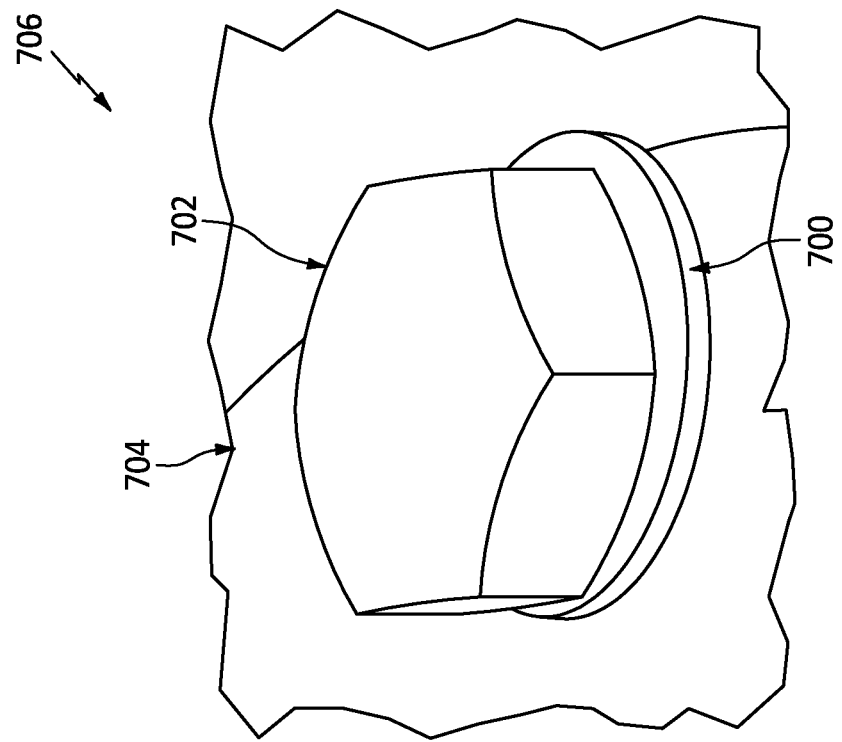
FIG. 7 is a partial perspective illustration of a structure with a washer skewed from a bolt head.

In step 608, the fastener assembly 28 is tightened (e.g., torqued to specification) using the socket device 32. The driver 30, for example, rotates the socket device 32 about the axis 34. The rotation of the socket device 32 in turn drives rotation of the fastener head 38 about the axis 34 while the nut 42 is held circumferentially fixed; e.g., via another tool, a fixture or elsewise. The faster shank 44 may thereby be threaded further into the nut 42 until a desired preload is provided. During this tightening, the washer 46 remains bounded by the centering sleeve 54. The centering sleeve 54 may thereby prevent (or at least significantly limit within tolerances) any skewing (e.g., misalignment, eccentricity) between the washer 46 and the fastener element 36. By contrast, referring to FIG. 7, a washer 700 may skew to a side of a fastener head 702 (e.g., the washer 700 and the head 702 may become eccentric) during a tightening process where the washer 700 is unbounded, as is the case when using a traditional socket to rotate the fastener head 702 for example. Skewing between the washer 700 and the fastener head 702 may have a negative impact on pressure loading/distribution onto an adjacent component 704. Furthermore, skewing between the washer 700 and the fastener head 702 may induce a rotational imbalance where the elements 700, 702 and 704 are included in a (e.g., high speed) rotating structure 706.

Figure 8:
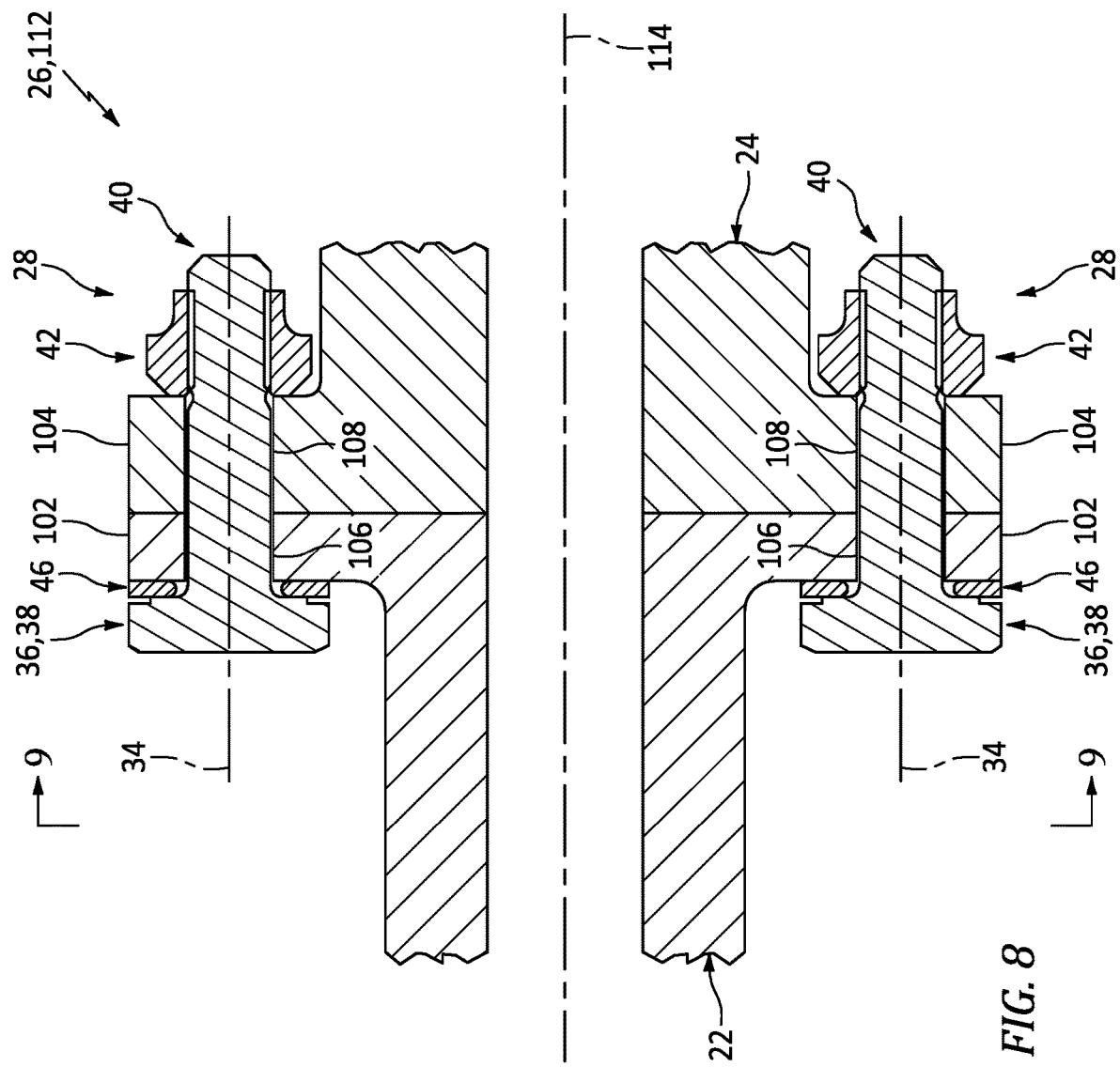
FIG. 8 is a partial sectional illustration of a rotating structure.
Figure 9:
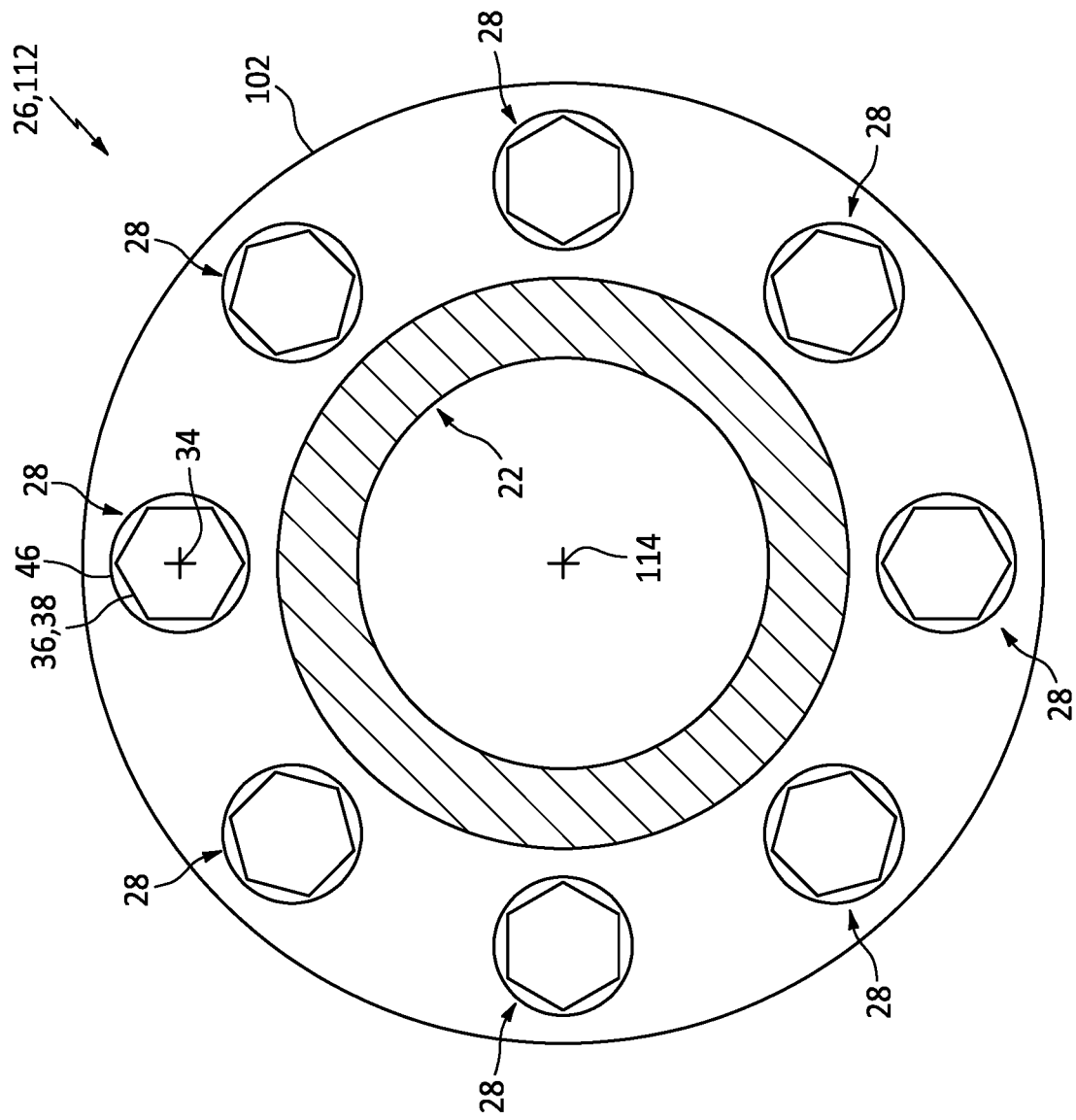
FIG. 9 is a cross-sectional illustration of the rotating structure taken along line 9-9 in FIG. 8.

Referring to FIG. 1, once the fastener assembly 28 is tightened (e.g., torqued to specification) using the socket device 32, that fastener assembly 28 secures (e.g., fixes) the first component 22 to the second component 24. The steps 604, 606 and 608, of course, may be repeated one or more times to further secure the first component 22 to the second component 24 using more or more additional fastener assemblies 28 as shown, for example, in FIGS. 8 and 9. In the embodiment of FIGS. 8 and 9, the structure 26 is configured as a rotating structure 112. This rotating structure 112 is configured to rotate about a rotational axis 114 of the rotating structure 112, where the fastener assemblies 28 are arranged circumferentially about the rotational axis 114 in an array. In such embodiments, one of the components (e.g., the first component 22) may be configured as or otherwise include a torque transfer device (e.g., a shaft or other linkage), and the other one of the components (e.g., the second component 24) may be configured as or otherwise includes a rotor (e.g., a bladed compressor rotor, a bladed turbine rotor, etc.). Of course, in other embodiments, each component 22, 24 may be configured as or otherwise include a torque transfer device or a rotor. In still other embodiments, the components 22 and 24 may alternatively be configured as part of a stationary structure; e.g., an engine case structure. The present disclosure therefore is not limited to any particular structure configurations, nor to any particular component configurations.

In some embodiments, referring to FIG. 2, the socket device 32 may be configured as a monolithic body. The socket 52 and the centering sleeve 54, for example, may be forged, machined, additively manufactured and/or otherwise formed from a single mass of material.

In some embodiments, referring to FIG. 10, the centering sleeve 54 may be formed discrete from the socket 52 and subsequently attached to the socket 52. The centering sleeve 54 of FIGS. 10 and 11, for example, is formed as part of a socket adaptor 116. This socket adaptor 116 includes the centering sleeve 54 and a sleeve mount 118 connected to (e.g., formed integral with) the centering sleeve 54. The sleeve mount 118 may be configured as a tubular body which projects axially out from the centering sleeve 54. This sleeve mount 118 is mounted onto the socket 52, where the sleeve mount 118 axially overlaps and circumscribes the socket 52. The sleeve mount 118 may be attached to the socket 52 via bonding (e.g., brazing, welding, adhering, etc.) and/or via a mechanical connection (e.g., an interference fit, a press fit, etc.). With this arrangement, the sleeve mount 118 mounts the centering sleeve 54 to the socket 52 at the socket second end 68.

In some embodiments, referring to FIGS. 5 and 10, the sleeve inner surface 84 may be configured as a circumferentially uninterrupted cylindrical surface. With this arrangement, the centering sleeve 54 may have a full-hoop annular geometry.

In some embodiments, referring to FIG. 11, the sleeve inner surface 84 may be one of a plurality of sleeve inner surfaces 84 formed/carried by the centering sleeve 54. The socket adaptor 116 of FIG. 11, for example, includes a plurality of fingers 120. Each circumferentially neighboring (e.g., adjacent) pair of the fingers 120 is separated by a slot 122. Each slot 122 extends radially through the socket adaptor 116. Each slot 122 extends circumferentially within the socket adaptor 116 between the respective fingers 120. Each slot 122 projects radially into the socket adaptor 116 from the device second end 50, through the centering sleeve 54, and partially into the sleeve mount 118. With this arrangement, each finger 120 may include a respective circumferential segment 124 of the centering sleeve 54 and its respective sleeve inner surface 84.

Figure 12:
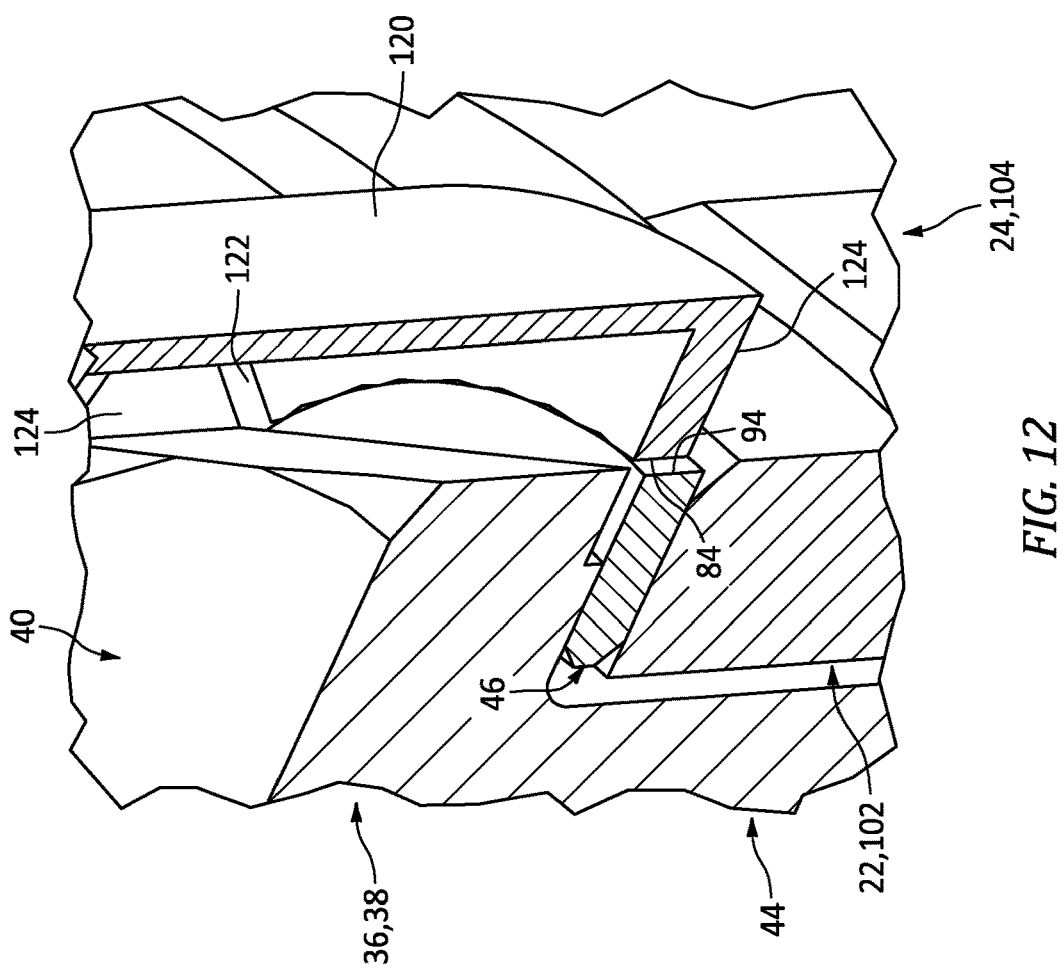
FIG. 12 is a partial perspective cutaway illustration of the adaptor of FIG. 11 mated with the fastener assembly during tightening, where the socket is omitted for clarity of illustration.

Referring to FIG. 12, each centering sleeve segment 124 and its respective sleeve inner surface 84 may be configured to radially engage (e.g., abut against) the washer outer surface 94. Furthermore, each centering sleeve segment 124 may (or may not) be biased slightly against the washer outer surface 94. The radius of each sleeve inner surface 84, for example, may be sized slightly smaller than the radius of the washer outer surface 94. With such an arrangement, the centering sleeve 54 and the fingers 120 may splay slightly open to mate with and clamp onto the washer 46.

Where the centering sleeve 54 includes multiple sleeve inner surfaces 84, each sleeve inner surface 84 may be arcuate (e.g., a circular segment). Furthermore, each sleeve inner surface 84 may have a uniform (e.g., constant) radius to the axis 34 as that sleeve inner surface 84 extends circumferentially about the axis 34 between opposing circumferential sides of the respective finger 120 and its centering sleeve segment 124.

Figure 13:
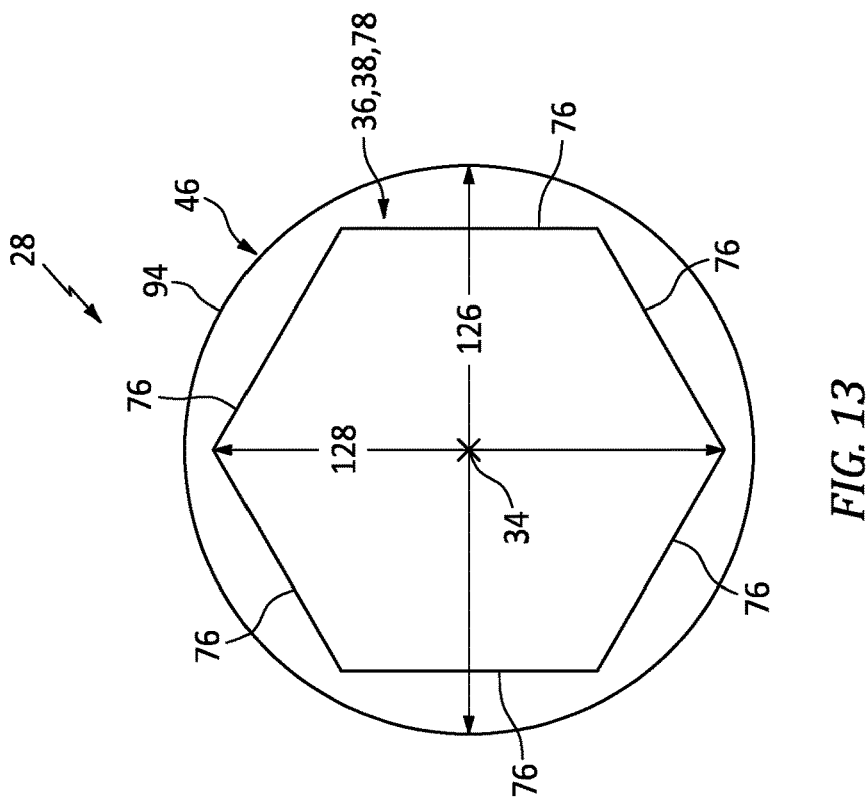
FIGS. 13 and 14 are end view illustrations of the fastener assembly with various washer configurations.
Figure 15:
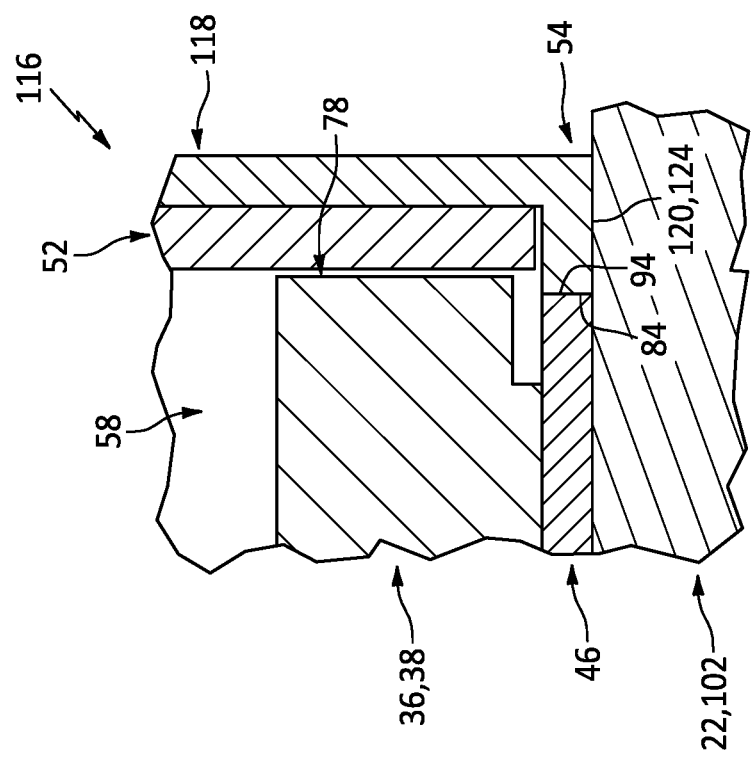
FIG. 15 is a partial sectional illustration of the fastener assembly of FIG. 14 arranged with the socket device for tightening.
Figure 14:
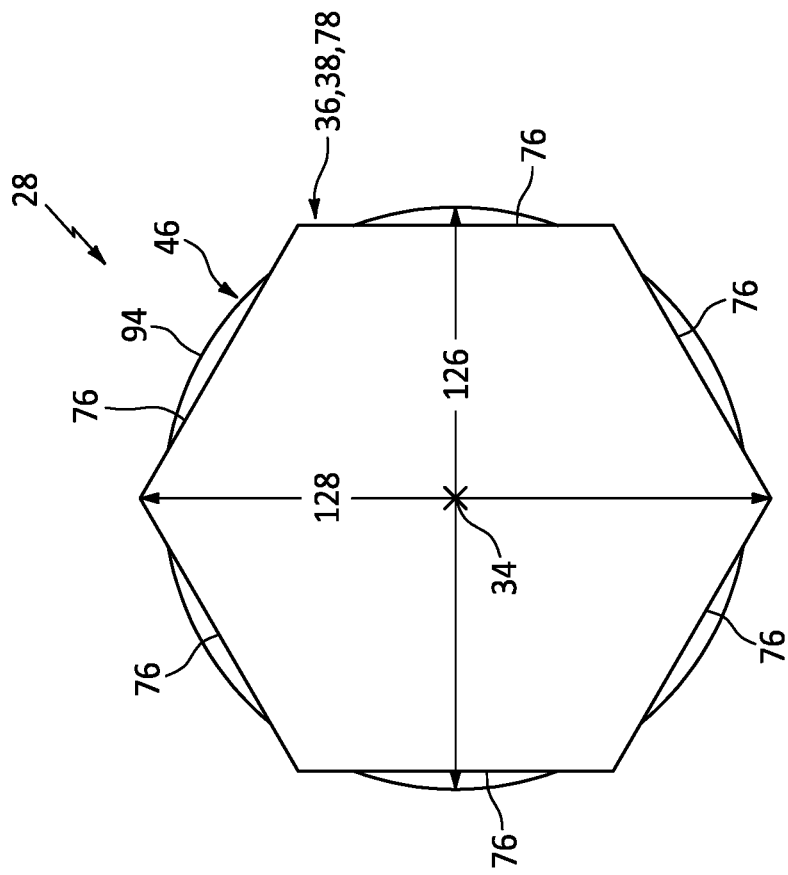

In some embodiments, referring to FIG. 13, an outer diameter 126 of the washer outer surface 94 may be sized greater than (or equal to) a largest outer lateral width 128 of the fastener element 36 and/or its wrenching feature 78. In other embodiments, referring to FIG. 14, the outer diameter 126 of the washer outer surface 94 may be sized smaller than the largest outer lateral width 128 of the fastener element 36 and/or its wrenching feature 78. In such embodiments, referring to FIG. 15, the centering sleeve 54 and at least one or more or all of its circumferential segments 124 may be positioned axially between the fastener element 36 and the first component 22. The ability for the fingers 120 to splay apart therefore may facilitate mating the centering sleeve 54 with the washer 46/removal of the centering sleeve 54 from the washer 46.

Figure 16:
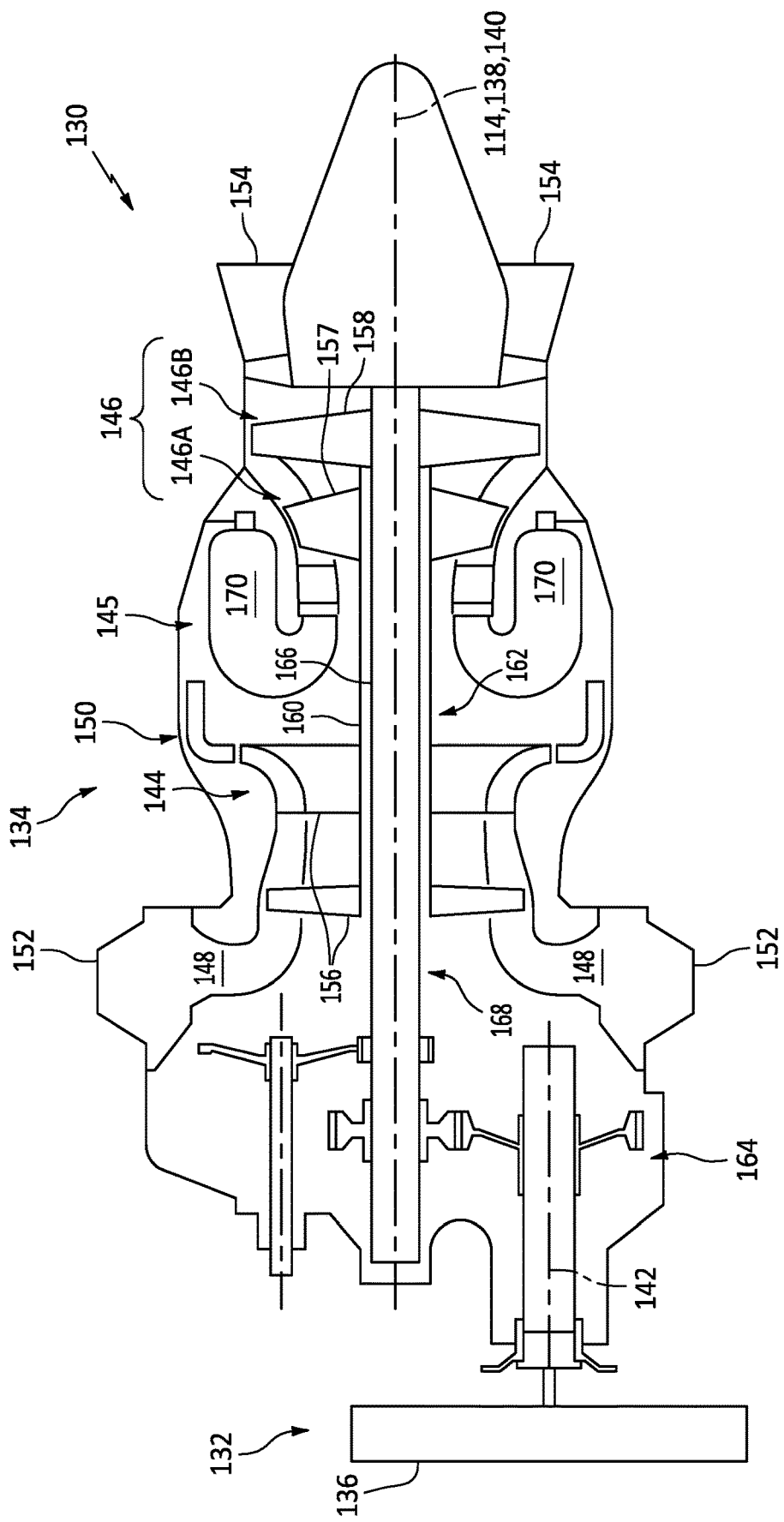
FIG. 16 is a side schematic illustration of a gas turbine engine.

FIG. 16 illustrates a gas turbine engine 130 which may include the structure 26 of FIG. 1/the rotating structure 112 of FIGS. 8 and 9. This gas turbine engine 130 includes a mechanical load 132 and a gas turbine engine core 134.

The mechanical load 132 may be configured as or otherwise include at least (or only) one driven rotor 136. This driven rotor 136 may be a bladed propulsor rotor for an aircraft propulsion system. The driven rotor 136, for example, may be a propeller rotor where the gas turbine engine 130 is configured as a turboprop gas turbine engine. The driven rotor 136 may alternatively be a helicopter rotor (e.g., a main rotor) where the gas turbine engine 130 is configured as a turboshaft gas turbine engine. The present disclosure, however, is not limited to turboprop and turboshaft gas turbine engine applications. The gas turbine engine 130, for example, may alternatively be configured as a turbofan gas turbine engine and the bladed rotor may be a fan rotor. In another example, the gas turbine engine 130 may be configured as a turbojet gas turbine engine and the bladed rotor may be a compressor rotor. Furthermore, the present disclosure is not limited to aircraft propulsion system applications. The driven rotor 136, for example, may alternatively be a generator rotor where the gas turbine engine 130 is included in a power generation system for an aircraft or non-aircraft application; e.g., an auxiliary power unit (APU) or an industrial powerplant.

The engine core 134 of FIG. 16 extends axially along an axial centerline 138 of the engine core 134. This axial centerline 138 may be coaxial with a rotational axis 140 (e.g., the rotational axis 114) of one or more rotors included in the engine core 134. The axial centerline 138 may also be parallel with a rotational axis 142 of the driven rotor 136. The engine core 134 of FIG. 16 includes a compressor section 144, a combustor section 145 and a turbine section 146. The turbine section 146 includes a high pressure turbine (HPT) section 146A and a low pressure turbine (LPT) section 146B.

The engine sections 144-146B are arranged sequentially along a (e.g., annular) core flowpath 148 and within an engine housing 150. This core flowpath 148 extends longitudinally within the engine core 134 from an upstream airflow inlet 152 into the engine core 134 to a downstream airflow exhaust 154 from the engine core 134. Here, the airflow inlet 152 is also an inlet into the gas turbine engine 130 and the exhaust 154 is also an exhaust from the gas turbine engine 130; however, the present disclosure is not limited to such an exemplary arrangement. The engine housing 150 of FIG. 16 includes an engine case (e.g., a core case) housing the compressor section 144, the combustor section 145 and the turbine section 146.

The compressor section 144, the HPT section 146A and the LPT section 146B each include one or more bladed rotors 156-158. Each of these bladed rotors 156-158 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 156 is connected to and driven by the HPT rotor 157 through a high speed shaft 160. At least (or only) the compressor rotor 156, the HPT rotor 157 and the high speed shaft 160 may collectively form a high speed rotating structure 162 that is rotatable about the rotational axis 140. The driven rotor 136 of FIG. 16 is connected to an output of a geartrain 164. An input of the geartrain 164 is connected to the LPT rotor 158 through a low speed shaft 166. At least (or only) the LPT rotor 158 and the low speed shaft 166 may collectively form a low speed rotating structure 168 that is rotatable about the rotational axis 140. Each of the engine shafts 160 and 166 is rotatably supported by a plurality of bearings (not shown in FIG. 16 for ease of illustration). Each of these bearings is connected to the engine housing 150 by an internal engine support structure. Here, the rotating structure 112 of FIGS. 8 and 9 may be configured as part of one of the rotating structures 162 or 168.

During gas turbine engine operation, air enters the engine core 134 through the airflow inlet 152 and enters the core flowpath 148. The air within the core flowpath 148 may be referred to as "core air". This core air is compressed by the compressor rotor 156 and directed into a (e.g., annular) combustion chamber 170 of a (e.g., annular) combustor in the combustor section 145. Fuel is injected into the combustion chamber 170 through one or more fuel injectors and mixed with the compressed core air to provide a fuel-air mixture. This fuel-air mixture is ignited and combustion products thereof flow through and sequentially cause the HPT rotor 157 and the LPT rotor 158 to rotate. The rotation of the HPT rotor 157 drives rotation of the compressor rotor 156 and, thus, compression of the air received from the airflow inlet 152. The rotation of the LPT rotor 158 drives rotation of the driven rotor 136.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly method, comprising:
arranging a first component with a second component; and
securing the first component to the second component using a fastener assembly, the fastener assembly including a bolt and a washer, the bolt comprising a bolt head with a wrenching feature, the washer having an outer surface, and the securing including mating a socket device with the bolt head and the washer, the socket device engaging the wrenching feature and the outer surface; and rotating the bolt head about an axis using the socket device to tighten the fastener assembly and clamp the washer axially between the first component and the bolt head, wherein the socket device maintains the washer coaxial with the bolt during the rotating;

wherein the socket device comprises a centering sleeve that has a circumferentially segmented portion at an axial end, a socket and a sleeve mount;

wherein the circumferentially segmented portion of the centering sleeve extends beyond the bolt head and circumferentially around the washer, and the circumferentially segmented portion of the centering sleeve radially engages the outer surface; and wherein the socket mates with the wrenching feature;

wherein the sleeve mount circumscribes the socket, the sleeve mount is formed integral with the centering sleeve, and the sleeve mount mounts the centering sleeve to the socket;

wherein the outer surface of the washer has a washer radius; and wherein the circumferentially segmented portion of the centering sleeve has a sleeve radius that is smaller than the washer radius.

2. The assembly method of claim 1, wherein the centering sleeve further comprises a plurality of fingers, and each adjacent pair of the plurality of fingers is separated by a slot that terminates at the axial end.

3. The assembly method of claim 2, wherein the slot extends from the axial end through the centering sleeve.

4. The assembly method of claim 3, wherein the slot extends radially through the socket device.

5. The assembly method of claim 1, wherein the outer surface is a cylindrical outer surface of the washer.

6. An assembly method, comprising:

arranging a first component with a second component; and securing the first component to the second component using a fastener assembly, the fastener assembly including a fastener element and a washer, the fastener element comprising a wrenching feature, the washer having a full-hoop annular body with a cylindrical outer surface, and the securing including mating a socket device with the fastener element and the washer, the socket device engaging the wrenching feature and the cylindrical outer surface; and rotating the fastener element about an axis using the socket device to tighten the fastener assembly and clamp the washer axially between the first component and the fastener element, wherein the socket device centers the washer to the fastener element during the rotating;

wherein the socket device comprises an unsegmented counterbore at an axial end of the socket device, and the washer is seated in the counterbore;

wherein the socket device further comprises a centering sleeve, a socket and a sleeve mount;

wherein the centering sleeve extends circumferentially around the washer and radially engages the cylindrical outer surface;

wherein the socket mates with the wrenching feature;

wherein the sleeve mount circumscribes the socket, and the sleeve mount mounts the centering sleeve to the socket;

wherein the counterbore further comprises a washer receptacle, the washer receptacle has a washer receptacle length that is constant; and wherein the washer has a washer thickness, and the washer receptacle length is smaller than the washer thickness.

7. The assembly method of claim 6, wherein the centering sleeve comprises a cylindrical inner surface; and the cylindrical inner surface circumscribes and is radially adjacent the cylindrical outer surface.

8. The assembly method of claim 6, wherein the centering sleeve comprises a plurality of arcuate surfaces; and the plurality of arcuate surfaces are arranged circumferentially around and are radially adjacent the cylindrical outer surface.

9. The assembly method of claim 6, wherein the socket device further comprises a receptacle with a polygonal cross-sectional geometry;

the receptacle projects axially into the socket device from the counterbore; and the receptacle receives the wrenching feature.

10. The assembly method of claim 6, wherein the centering sleeve is circumferentially segmented.

11. The assembly method of claim 6, wherein the centering sleeve has a full-hoop annular geometry.

12. The assembly method of claim 6, wherein an outer diameter of the cylindrical outer surface is equal to or greater than a largest outer lateral width of the fastener element.

13. The assembly method of claim 6, wherein the fastener element comprises a bolt head.

14. The assembly method of claim 6, wherein the first component comprises a first mount;

the second component comprises a second mount abutted against the first mount; and the fastener assembly secures the first mount to the second mount.

15. The assembly method of claim 6, wherein a gas turbine engine rotating structure comprises the first component, the second component and the fastener assembly.

* * * * *